US011782681B1

(12) United States Patent
Assunção et al.

(10) Patent No.: US 11,782,681 B1
(45) Date of Patent: Oct. 10, 2023

(54) PROVIDING RESOLUTION SUGGESTIONS IN A PROGRAM DEVELOPMENT TOOL

(71) Applicant: OutSystems—Software em Rede, S.A., Linda-a-Velha (PT)

(72) Inventors: Filipe Guerreiro Assunção, Lisbon (PT); João Pedro Gonçalves Lages, Lisbon (PT); António Manuel de Carvalho dos Santos Alegria, Lisbon (PT)

(73) Assignee: OutSystems—Software em Rede, S.A.

( * ) Notice: Subject to any disclaimer, the term of this patent is extended or adjusted under 35 U.S.C. 154(b) by 149 days.

(21) Appl. No.: 17/399,975

(22) Filed: Aug. 11, 2021

Related U.S. Application Data

(60) Provisional application No. 63/117,895, filed on Nov. 24, 2020, provisional application No. 63/117,899, filed on Nov. 24, 2020.

(51) Int. Cl.
| | |
|---|---|
| *G06F 16/178* | (2019.01) |
| *G06F 11/36* | (2006.01) |
| *G06F 8/33* | (2018.01) |
| *G06F 8/71* | (2018.01) |
| *G06F 8/77* | (2018.01) |
| *G06F 8/20* | (2018.01) |
| *G06N 5/022* | (2023.01) |

(Continued)

(52) U.S. Cl.
CPC .............. *G06F 8/20* (2013.01); *G06F 16/906* (2019.01); *G06F 16/953* (2019.01); *G06N 5/022* (2013.01); *G06N 5/04* (2013.01); *G06F 8/33* (2013.01); *G06F 11/079* (2013.01)

(58) Field of Classification Search
CPC . G06F 8/20; G06F 8/33; G06F 16/906; G06F 16/953; G06F 11/079; G06N 5/022; G06N 5/04
See application file for complete search history.

(56) References Cited

U.S. PATENT DOCUMENTS

| | | |
|---|---|---|
| 6,269,474 B1 | 7/2001 | Price |
| 2005/0113098 A1 | 5/2005 | Cankaya |

(Continued)

OTHER PUBLICATIONS

Taek Lee et al.,Developer Micro Interaction Metrics for Software Defect Prediction, Nov. 2016, [Retrieved on May 12, 2023]. Retrieved from the internet: <URL: https://ieeexplore.ieee.org/stamp/stamp.jsp?tp=&arnumber=7447797> 21 Pages (1015-1035) (Year: 2016).*

(Continued)

*Primary Examiner* — Anibal Rivera
(74) *Attorney, Agent, or Firm* — Van Pelt, Yi & James LLP

(57) ABSTRACT

User interactions and states of a program development tool utilized to develop an application are tracked. Input features associated with the tracked user interactions and the states are provided to a trained machine learning model to determine a prediction result associated with whether a user is likely unable to proceed in the development of the application and likely needs assistance. In response to a determination that the prediction result at least meets a threshold, one or more resolution suggestions are automatically provided. The one or more resolution suggestions is at least one of: automatically selected based on at least a portion of the tracked user interactions and states, or automatically selected based at least in part the prediction result.

20 Claims, 9 Drawing Sheets

(51) Int. Cl.
  *G06F 16/906* (2019.01)
  *G06F 16/953* (2019.01)
  *G06N 5/04* (2023.01)
  *G06F 11/07* (2006.01)

(56) References Cited

U.S. PATENT DOCUMENTS

| | | | |
|---|---|---|---|
| 2006/0085799 | A1 | 4/2006 | Hoerle |
| 2007/0237161 | A1 | 10/2007 | Akisada |
| 2012/0150797 | A1 | 6/2012 | Landy |
| 2012/0250494 | A1 | 10/2012 | Rong |
| 2012/0271810 | A1 | 10/2012 | Liu |
| 2017/0212729 | A1 | 7/2017 | Sridhar |
| 2017/0262868 | A1 | 9/2017 | Manjunath |
| 2018/0089561 | A1* | 3/2018 | Oliner ............... G06F 16/26 |
| 2018/0157734 | A1 | 6/2018 | Drushku |
| 2018/0203674 | A1 | 7/2018 | Dayanandan |
| 2019/0018400 | A1 | 1/2019 | Mccann |
| 2019/0095764 | A1 | 3/2019 | Li |
| 2019/0251440 | A1 | 8/2019 | Kasiviswanathan |
| 2019/0266070 | A1* | 8/2019 | Bhandarkar ......... G06F 11/3072 |
| 2020/0005219 | A1* | 1/2020 | Stevens ............... G06F 8/71 |
| 2020/0097261 | A1* | 3/2020 | Smith ............... G06F 40/174 |
| 2020/0183555 | A1 | 6/2020 | Al-Sallami |
| 2020/0183664 | A1 | 6/2020 | Lee |
| 2020/0192652 | A1 | 6/2020 | Worsnop |
| 2020/0371778 | A1 | 11/2020 | Ni |
| 2021/0012209 | A1 | 1/2021 | Sikka |
| 2021/0192355 | A1 | 6/2021 | Loebl |
| 2021/0303447 | A1* | 9/2021 | Haze ............... G06F 11/3664 |
| 2022/0019496 | A1* | 1/2022 | Lozano ............... G06F 11/0778 |

OTHER PUBLICATIONS

Amanda Silver, Introducing Visual Studio IntelliCode, Microsoft DevBlogs, pp. 1-5, May 7, 2018.
Author Unknown, "Firedrop AI: The machine that will build your next website", retrieved from <https://medium.com/@firedrop/the-machine-that-will-build-your-next-website-90e476241836> on Jun. 8, 2021; published Jun. 1, 2016.
Author Unknown, "Wikipedia: AppSheet", retrieved from <https://en.wikipedia.org/w/index.php?title=AppSheet&oldid=976348103> on Jun. 8, 2021; published Sep. 2, 2020.
Author Unknown,"xgdsmileboy / SimFix", retrieved from <https://github.com/xgdsmileboy/SimFix/blob/master/README.md> on Jun. 8, 2021, published May 28, 2019.
Jason Warner, Introducing the Checks API, a better way to connect integrations and code, The GitHub Blog, pp. 1-7, May 7, 2018.
JS Nice, "Statistical renaming, Type inference and Deobfuscation", Mar. 2018.
Sadowski et al., Lessons from Building Static Analysis Tools at Google, Communications of the ACM, pp. 1-11, Apr. 2018.
Seoul Engineer, Paper Review: 'Lessons from Building Static Analysis Tools at Google', sourcedtech, May 6, 2018.
Sukharev et al., Assisted code review, running custom code analyzers on pull requests, Oct. 10, 2019.
Tadeu Zagallo, Neal, Uber's Open Source Language-Agnostic Linting Platform, uber.com, pp. 1-6, Jan. 31, 2018.
Uri Alon et al., "code2vec: Learning Distributed Representations of Code", Oct. 30, 2018.
Sylvestre Ledru, "Making the Building of Firefox Faster for You with Clever-Commit from Ubisoft", from <https://blog.mozilla.org/futurereleases/2019/02/12/making-the-building-of-firefox-faster-for-you-with-clever-commit-from-ubisoft/>, Feb. 12, 2019.
Tony Bellramelli, "pix2code: Generating Code from a Graphical User Interface Screenshot", Sep. 19, 2017.
Tingting Chang, "Using OpenCV to transform screen designs into low-fi block designs", from <https://medium.com/pushtostart/lo-fi-transformer-a3c65eeae70>, Mar. 19, 2019.
William Blum, "Neural Fuzzing: applying DNN to software security testing", from <https://www.microsoft.com/en-us/research/blog/neural-fuzzing/>, Nov. 13, 2017.
Zann Yap, "Intelligent Automations with Machine Learning and AI", from <https://product.workato.com/recipe-iq-intelligent-automations/>, Jul. 18, 2017.
Abhishek Pradhan, "Codota—An AI coding partner", from <https://medium.com/lingvo-masino/codota-an-ai-coding-partner-6fb198381a61>, Aug. 3, 2017.
Akshat Sharma, "6 ways Quizzes in Google Forms are getting smarter", from <https://blog.google/outreach-initiatives/education/6-ways-quizzes-google-forms-are-getting-smarter/>, published May 10, 2018.
Alex Wilhelm, "MonkeyLearn raises $2.2M to build out its no-code AI text analysis service", from <https://techcrunch.com/2020/07/07/monkeylearn-raises-2-2m-to-build-out-its-no-code-ai-text-analysis-service/>, Jul. 7, 2020.
Alon et al., "code2vec: Learning Distributed Representations of Code", Oct. 30, 2018.
Aman Mittal, "How to Create a Chatbot with Dialogflow, NodeJS, and Webhooks", from <https://medium.com/crowdbotics/how-to-create-a-chatbot-with-dialogflow-nodejs-and-webhooks-eecbbce97d8b>, Jul. 19, 2019.
Andrey Cheptsov, "Enjoying Java and Being More Productive with IntelliJ IDEA", from <https://blogjetbrains.com/idea/2016/03/enjoying-java-and-being-more-productive-with-intellij-idea/>, Mar. 3, 2016.
Anne Gao, "Intelligent Visual Studio Search Service", from <https://devblogs.microsoft.com/visualstudio/intelligent-visual-studio-search-service/>, published Mar. 2, 2021.
AppSheet, Wikipedia, from <https://en.wikipedia.org/w/index.php?title=AppSheet&oldid=976348103> last modified Sep. 2, 2020, retrieved on Jun. 2021.
Author Unknown, "A bot disguised as a human software developer fixes bugs", by Emerging Technology from the arXiv, Oct. 23, 2018.
Author Unknown, "Appvance.ai Launches Appvance IQ", Apr. 4, 2018.
Author Unknown, "DeepCode boosts its intelligence and can now explain the reasons behind coding errors", from <https://www.deepcode.ai/blog/deepcode-boosts-its-intelligence-and-can-now-explain-the-reasons-behind-coding-errors, Oct. 7, 2019.
Author Unknown, "Facebook/infer: Infer version v1.0.0", Oct. 12, 2020.
Author Unknown, "JS Nice: Statistical renaming, Type inference and Deobfuscation", Mar. 2018.
Author Unknown, "QVscribe Launches Latest Engineering Analysis Tool", from <https://innovacorp.ca/news/qvscribe-launches-latest-engineering-analysis-tool>, Feb. 8, 2017.
Author Unknown, "Randoop Manual", from <https://randoop.github.io/randoop/manual/>, May 3, 2020.
Author unknown, "ServiceNow to Acquire Loom Systems", from <https://www.servicenow.com/company/media/press-room/servicenow-to-acquire-loom-systems.html>, Jan. 22, 2020.
Author Unknown, "SimFix/README.md", from <https://github.com/xgdsmileboy/SimFix/blob/master/README.md>, May 28, 2019.
Author Unknown, "The machine that will build your next website by Firedrop AI", from <https://medium.com/@firedrop/the-machine-that-will-build-your-next-website-90e476241836>, Jun. 1, 2016.
Author unknown, "Tutorial 1: Dynatrace—Application Performance Monitoring (APM) Tool", from <https://medium.com/knoldus/tutorial-1-dynatrace-application-performance-monitoring-apm-tool-2f97ec2830a6>, Apr. 12, 2017.
Author Unknown, "Using Flash Fill in Excel", from <https://support.microsoft.com/en-us/office/using-flash-fill-in-excel-3f9bcf1e-db93-4890-94a0-1578341f73f7>, Jun. 8, 2021.
Author unknown, "ZEOS: Why Our Zero-code Environment Will Work for You", Apr. 28, 2020.
Bader et al., "Getafix: Learning to Fix Bugs Automatically", Proc. ACM Program. Lang., vol. 3, No. OOPSLA, Article 159. Oct. 2019.
Barr et al., "The Oracle Problem in Software Testing: A Survey", IEEE Transactions on Software Engineering, vol. 41, No. 5, May 2015.

(56) References Cited

OTHER PUBLICATIONS

Bielik et al., "Robust Relational Layout Synthesis from Examples for Android", Proc. ACM Program. Lang., vol. 2, No. OOPSLA, Article 156. Nov. 2018.
Bilal Haidar, "Applitools—The automated visual regression testing framework", from <Jun. 9, 2021 Applitools—The automated visual regression testing framework | by This Dot Media | Medium https://medium.com/@thisdotmedia/applitools-the-automated-visual-regression-testing-framework-18ebada47977>, Oct. 25, 2018.
C. Williams, "Putting AI bots to the test: Test.ai and the future of app testing", Assignment: Value Creation with AI, Dec. 4, 2019.
Celeste Barnaby, "Aroma: Using ML for code recommendation", from <https://ai.facebook.com/blog/aroma-ml-for-code-recommendation/>, Apr. 4, 2019.
Emil Protalinski, "Dry.io wants to democratize software development using AI", from <https://venturebeat.com/2019/02/26/dry-io-wants-to-democratize-software-development-using-ai/>, Feb. 26, 2019.
Feng et al., "Program Synthesis using Conflict-Driven Learning", Nov. 21, 2017.
Gina Baldassarre, "Stratejos helps teams manage daily admin and coordination of projects", Jul. 17, 2018.
Henning Femmer, "Requirements Quality Defect Detection with the Qualicen Requirements Scout", 2018.
Jain et al., "Sketch2Code: Transformation of Sketches to UI in Real-time Using Deep Neural Network", Oct. 20, 2019.
Jeremias Rößler, "recheck and the "Git for the GUI"", Excerpt from PNSQC Proceedings, Aug. 2020.
Ke Mao, "Sapienz technology leverages automated test design to make the testing process faster, more comprehensive, and more effective", from <https://engineering.fb.com/2018/05/02/developer-tools/sapienz-intelligent-automated-software-testing-at-scale/>, May 2, 2018.
Kelly Kirkham, "9 Incredible AI Powered Tools To Help Developers Work Smarter", from <https://blog.100tb.com/9-incredible-ai-powered-tools-to-help-developers-work-smarter>, Mar. 19, 2018.
Kevin Hart, "Revuze, turn any textual customer opinion to deep BI automatically", from <https://medium.com/petacrunch/revuze-turn-any-textual-customer-opinion-to-deep-bi-automatically-c538decad944>, Sep. 3, 2019.
Kyle Wiggers, "Google acquires AI customer service startup Onward", from <https://venturebeat.com/2018/10/02/google-acquires-onward-an-ai-customer-service-startup/>, Oct. 2, 2018.
Liam Tung, "As Google enters AI coding autocomplete race, Kite for Python language gets smarter", from <https://www.zdnet.com/article/as-google-enters-ai-coding-autocomplete-race-kite-for-python-language-gets-smarter/>, Sep. 24, 2019.
Mabl, "Maintenance-Free Automated Functional Testing with Auto-Healing Tests", from <https://medium.com/hackernoon/maintenance-free-automated-functional-testing-with-auto-healing-tests-f395cd5857fc>, Feb. 26, 2018.
Marcelo Novaes de Oliveira, "Assisted Code Review", from <https://docs.google.com/document/d/1ULRp10hnGtoc_M1cbfMntxpPuWy-dNrEgjKI5n6Cmrc/edit>, Aug. 17, 2018.
Marginean et al., "SapFix: Automated End-to-End Repair at Scale", Feb. 2019.
Mike Butcher, "Engineer.ai launches its Builder Now platform for rapid app prototyping and building", from <https://techcrunch.com/2019/11/25/engineer-ai-launches-its-builder-now-platform-for-rapid-app-prototyping-and-building/>, Nov. 25, 2019.
Mix, "Airbnb built an AI that turns design sketches into product source code", from <https://thenextweb.com/news/airbnb-ai-sketches-design-code>, Oct. 25, 2017.
Namita Prabhu, "Can you build an integration pipeline for me?", from <https://www.snaplogic.com/blog/iris-integration-assistant>, published May 25, 2017.
Paul Lambert, "Subject: Write emails faster with Smart Compose in Gmail", from <https://www.blog.google/producs/gmail/subject-write-emails-faster-smart-compose-gmail/>, published May 8, 2018.
Pradel et al., "DeepBugs: A Learning Approach to Name-Based Bug Detection", Proc. ACM Program. Lang., vol. 2, No. OOPSLA, Article 147. Nov. 2018.
Raghothaman et al., "DIFFLOG: Beyond Deductive Methods in Program Analysis", 2018.
Rory Dickenson, "AI for Enterprise Customer Service: It's All In The Data", from <https://medium.com/ultimate-ai/https-medium-com-ultimate-ai-ai-for-enterprise-customer-service-clustering-64571bfcbdb3>, Nov. 27, 2018.
Soliudeen Ogunsola, "Getting Started with TeleportHQ", from <https://medium.com/visualdevspace/getting-started-with-teleporthq-53a671ec56d5> May 12, 2020.
Sonia Kim, "Neural Code Search: ML-based code search using natural language queries", from <https://ai.facebook.com/blog/neural-code-search-ml-based-code-search-using-natural-language-queries/>, Jun. 24, 2019.

* cited by examiner

PROVIDING RESOLUTION SUGGESTIONS IN A PROGRAM DEVELOPMENT TOOL

CROSS REFERENCE TO OTHER APPLICATIONS

This application claims priority to U.S. Provisional Patent Application No. 63/117,895 entitled MACHINE-ASSISTED COMPUTER PROGRAMMING filed Nov. 24, 2020 which is incorporated herein by reference for all purposes. This application claims priority to U.S. Provisional Patent Application No. 63/117,899 entitled MACHINE-ASSISTED COMPUTER PROGRAMMING filed Nov. 24, 2020 which is incorporated herein by reference for all purposes.

BACKGROUND OF THE INVENTION

Machine-assisted software development is an emerging field, and aims to enable developers to create executable computer programs without requiring coding language fluency or a high degree of domain knowledge. For example, developers can interact with a "low-code" or "no-code" software development tool embodied in a visual modeling environment to develop executable computer programs such as enterprise or consumer Web and mobile applications. Developers can design computer programs by interacting with a graphical user interface to visually model program functionality instead of manually writing code. Sometimes developers may get stuck because they do not know how to proceed with a task. Thus, there is a need to assist developers when they get stuck.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 6:
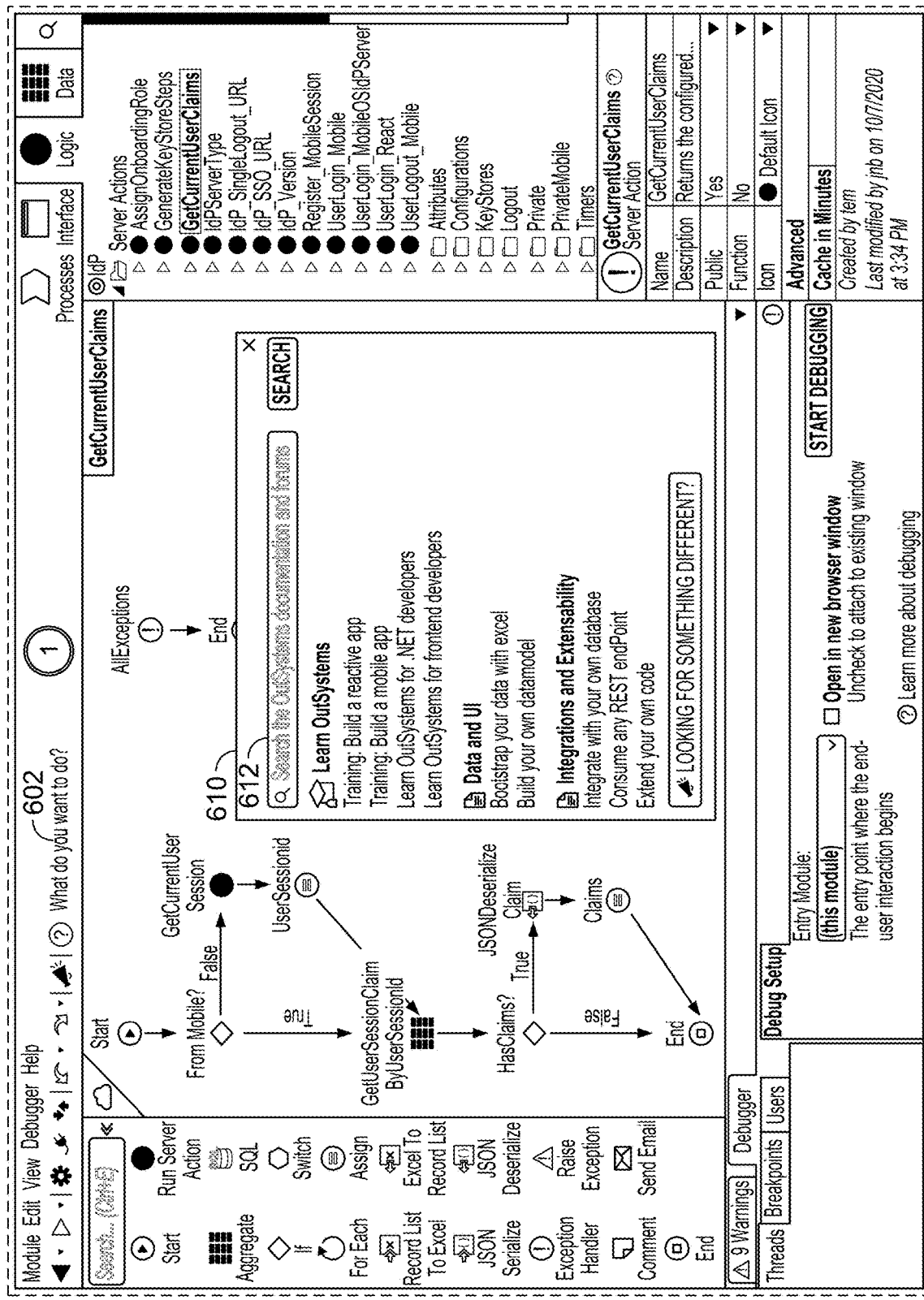
FIG. 6 illustrates an example of guidance provided in response to detecting a stuck moment according to some embodiments.

Techniques for providing resolution suggestions in a program development tool (e.g., programmatic logic flow builder, integrated development environment (IDE), visual modeling environment, etc.) are disclosed. The disclosed techniques detect when a computer program developer encounters an issue in the course of developing a computer program, and then determines and suggests specific resolutions. For example, an issue may be a stuck moment, which is a time window within which the developer does not know how to proceed to accomplish a given development task. The disclosed techniques can be applicable to every stage and aspect of a program development achieved using the program development tool such an IDE. For example, the computer program may be represented by a programmatic logic flow, which is developed within a program development tool including a programmatic logic flow builder. An example of a programmatic logic flow builder is further described herein with respect to FIG. 6. A programmatic logic flow is made of steps as further described herein. The terms "node" and "step" are used interchangeably. The resolution suggestion can be presented as links to resources or a customized suggestion related to a node or other element within a programmatic logic flow. The resolution suggestion can be provided via a graphical user interface in which a program development tool is presented as a graph as shown in FIG. 6. The disclosed techniques find application in a variety of contexts such as providing real-time or just-in-time help and orientation.

Figure 1:
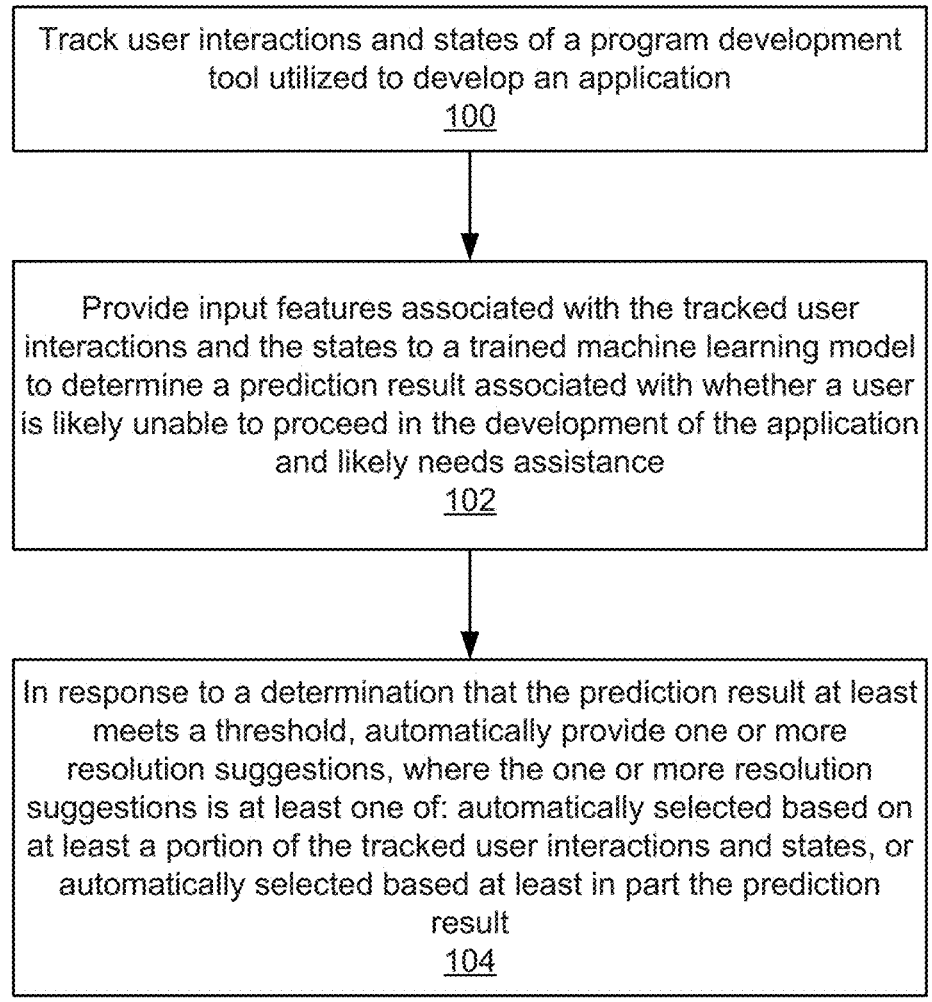
FIG. 1 is a flow diagram illustrating an embodiment of a process for providing resolution suggestions in a program development tool.

FIG. 1 is a flow diagram illustrating an embodiment of a process for providing resolution suggestions in a program development tool (e.g., including a programmatic logic flow builder). This process may be implemented on a system such as system 400 shown in FIG. 4. More specifically, in various embodiments the process is performed by code analysis engine 413 in cooperation with machine learning model(s) 414.

In the example shown, the process begins by tracking user interactions and states of the program development tool utilized to develop an application (100). User interactions include how a user interacts with a user interface reflecting how the user is navigating the program development tool during the course of developing an application. The program development tool may include a programmatic logic flow builder that is an application development platform in which a programmatic logic flow can be developed. The programmatic logic flow changes during the course of application development so it may have various/several states. The developer is stuck and may behave or interact with the program development tool in ways such as repeating actions, trying to undo an action, or the like. An example process for tracking user interactions and states of the program development tool is further described with respect to FIG. 2.

The process provides input features associated with the tracked user interactions and the states to a trained machine learning model to determine a prediction result associated with whether a user is likely unable to proceed in the development of the application and likely needs assistance (102).

Examples of trained machine learning models that can determine a prediction result include a gradient boosting classifier and a change-point detector. These examples are merely exemplary and not intended to be limiting as other machine learning models may be used in addition or instead. In various embodiments, the best results (most accurate prediction that a user is likely unable to proceed in the development of the application and likely needs assistance) are obtained when weighting the samples proportional to the distance to the beginning of the stuck moment (a time window where the user is unable to proceed in the development of the application).

The machine learning model can be trained to predict that a user is likely unable to proceed in the development of the application and likely needs assistance earlier within a period of being stuck (e.g., before a threshold time has elapsed). In other words, the model recognizes that a user is stuck earlier in the stuck moment, sometimes even before the stuck moment happens. This can be done by penalizing the model more when the time window is not predicted in time (within a threshold time). The longer the model takes to predict a stuck moment, the more the model is penalized.

The machine learning model can also be trained in a feedback loop, where when a user reports being stuck, associated data can be collected to improve the machine learning model's ability to predict stuck moments in the future.

The process automatically provides one or more resolution suggestions in response to a determination that the prediction result at least meets a threshold (104). The one or more resolution suggestions is at least one of: automatically selected based on at least a portion of the tracked user interactions and states, or automatically selected based at least in part the prediction result.

Resolution suggestions help the user to proceed with the development of the application (become unstuck). Resolution suggestions can be static such as linking to documentation or dynamic such as suggestions or auto-filled content specific to a user or search data. In various embodiments, static suggestions can be refactored to be dynamic based on user/search data. Suggestions can be displayed along with a reason for providing the suggestion. Examples of resolutions include but are not limited to: providing contextual help, automatically fixing the problem, linking to tutorials, documentation pages, or forum discussions. A process for providing contextual help is further described with respect to FIG. 5.

Figure 2:
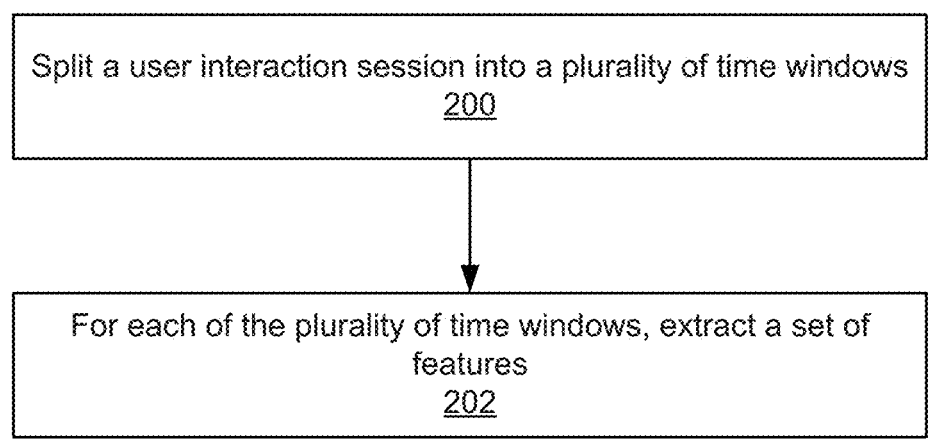
FIG. 2 is a flow diagram illustrating an embodiment of a process for tracking user interactions and states of a program development tool.

FIG. 2 is a flow diagram illustrating an embodiment of a process for tracking user interactions and states of a program development tool (e.g., including a programmatic logic flow builder). This process may be performed as part of another process such as 100 of FIG. 1. This process may be implemented on a system such as system 400 shown in FIG. 4.

In the example shown, the process begins by splitting a user interaction session into a plurality of time windows (200). A user interaction session is defined by a period of time when a user is interacting with the program development tool. For example, a user may logon and logoff and the time between the logon and logoff is a single session. As another example, a user interaction session may be some predefined time period such as a few hours. In various embodiments, the process splits the user interaction session into several time windows of a pre-defined and fixed size so that each time window can be individually processed efficiently. The time windows can be of various lengths. In an example, each time window is 15 seconds. In some embodiments, the process splits the user interaction session into several time windows of a dynamically determined length (e.g., dynamically determined based on speed/rate of programmatic logic flow development or speed/rate at which telemetry is being generated).

Figure 3:
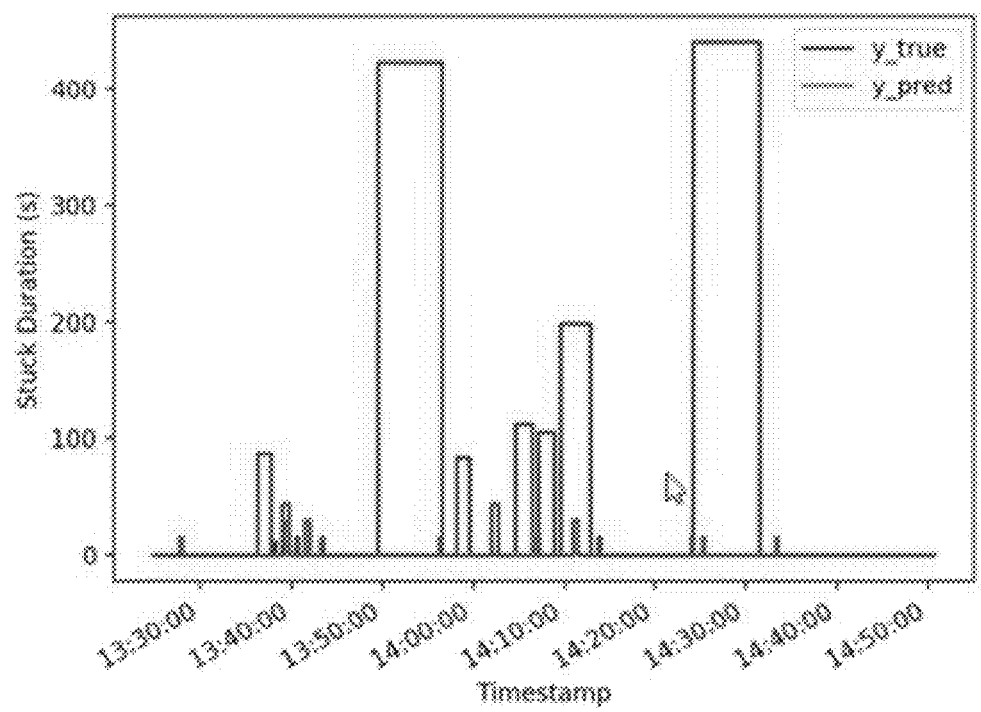
FIG. 3 shows an example of stuck moments.

FIG. 3 shows an example of stuck moments. The y_true line represents the true or actual observation of when a user was stuck. The y_pred line shows the predictions made by a machine learning model of whether a user was stuck. In this example, a prediction is made for every 15 second window, meaning the prediction is non-zero for a window if the machine learning model predicts that the user was stuck during the respective window. The heights (y-axis values) of the lines are proportional to the duration of the stuck interval.

Returning to FIG. 2, the process extracts a set of features for each of the plurality of time windows (202). The features are associated with user interaction with a program development tool (e.g., a programmatic logic flow builder) and can be included in the features input to train a machine learning model. In various embodiments, telemetry events are logged and converted into a numerical representation. Examples of events include user interaction, UI events, and system events such as changing, creating, or selecting.

The set of features can be from telemetry, state evolution, code, and/or user interaction. Examples of features from telemetry (logs) include:
 Tab Change (e.g., sum)—number of times the user changed between tabs (e.g., in Service Studio by OutSystems®: Processes/Interface/Logic/Data);
 Select (e.g., sum)—number of times the user selected anything (e.g., an assign node, the start node, the entity diagrams, . . . );
 Click (e.g., sum)—number of times the user clicked in specific way or anywhere (left click, right click, and double click);
 Create (e.g., sum)—number of times the user created specific components (e.g., aggregates);
 Delete (e.g., sum)—number of times the user deleted (opposite of create) components;
 Add Error (e.g., sum)—raise an error;
 Remove Error (e.g., sum)—solve an error;
 Show Help (e.g., sum)—number of times the user asks for help, e.g., by clicking a button or using a keyboard shortcut to get help, show documentation, or the like;
 Toolbox (e.g., sum)—number of clicks in toolbox components;
 One-click publishes (e.g., sum)—number of one-click publishes (1-CP), where a one-click publish is a graphical user interface button that a user can press to signal that the user is ready to compile the code;

Code Elements Tree (e.g., sum)—number of events that happen in the code elements tree (e.g., IDE components tree);

Code Elements Tree (e.g., sum)—clicks in the code elements tree, i.e., in the components that are in the processes, interface, logic, or data tabs;

Time Since Last Event (mean)—time elapsed since the last telemetry event;

Filtered Events (e.g., sum)—number of events being processed;

Total Events (e.g., sum)—total number of telemetry events;

Time Since Error Begin (e.g., max)—time elapsed since the first error was raised;

Time Since Non Error Begin (e.g., max)—time elapsed since the last error was solved;

Time Since 1-CP (e.g., max)—time elapsed since the last 1-CP; or

Active Errors (e.g., max)—number of active errors.

Figure 4:
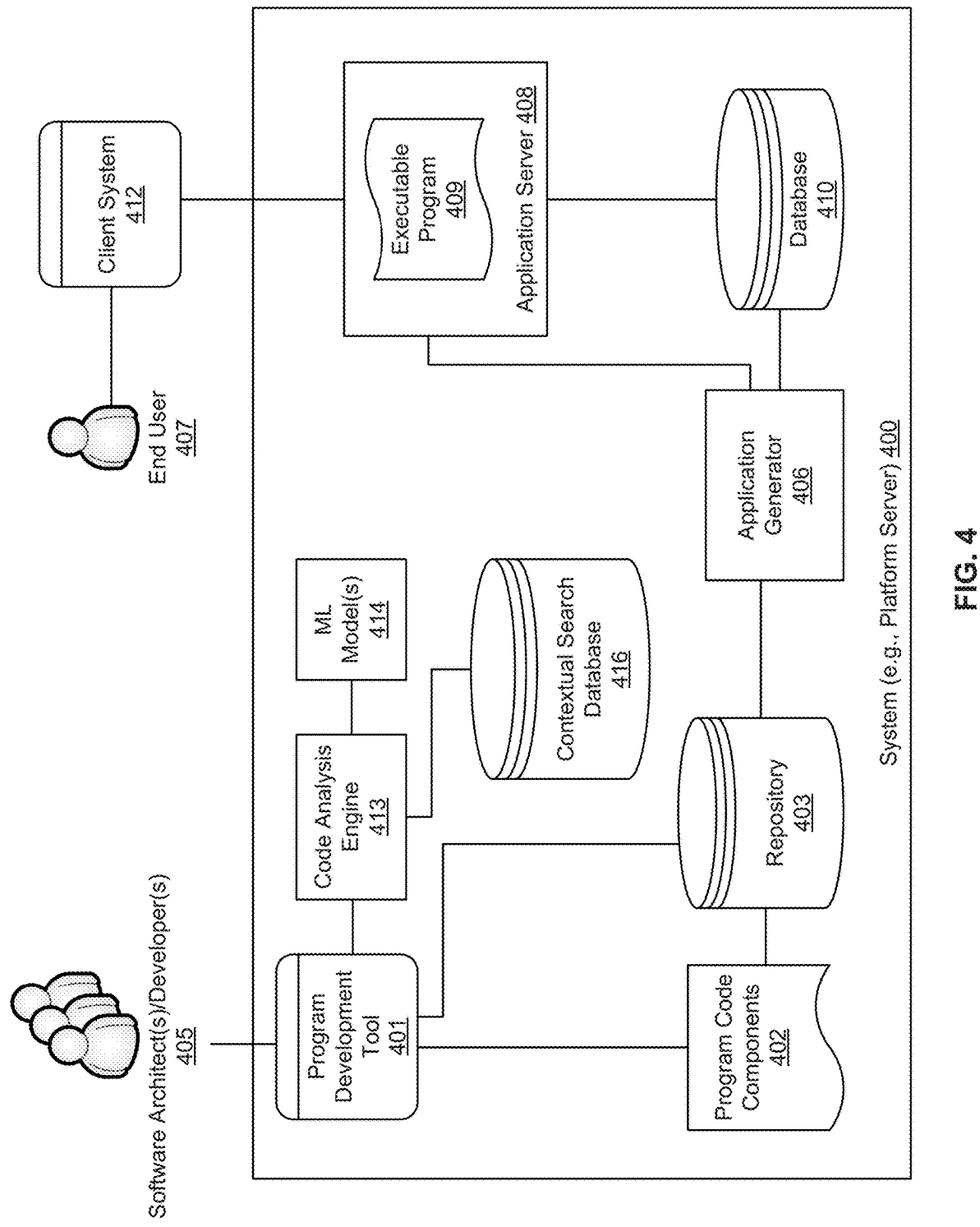
FIG. 4 is a block diagram illustrating an embodiment of a system providing resolution suggestions in a program development tool.

Features from state evolution refers to tracking changes of user state or context within the program development tool (e.g., including a programmatic logic flow builder also sometimes called a "visual modeling environment", e.g., see FIG. 4). For example, the interactions of the developer with various editing windows can be analyzed. This can be done in a variety of ways such as looking into UI Events, and focusing on the ones with type "Show," which correspond to a change in what the user is seeing on the screen. The "WindowOpened" events can also be analyzed, and correspond to pop-up windows. Examples of features from state evolution include:

Most frequent interaction with a user interface element such as a particular button, widget, window, or etc.; or
Number of interacted screens.

In various embodiments, features from user interactions can be extracted from telemetry events. Examples of features from user interactions include:

The percentage of followed user interactions that are the same;

The match percentage between two consecutive user interactions (e.g., mean, std, min, and max);

The maximum number of times the same user interaction is performed;

Number of user interactions per time-window, and since the beginning of the session (e.g., average, ratio).

Time since last user interaction (e.g., mean, std, max, min, count);

Time since last user select (e.g., mean, std, max, min, count);

The match percentage between two consecutive system events (e.g., mean, std, max, min);

Time to the first target time a target type was selected; or
Number of times a target type was selected.

As an alternative to 202, the process performs automatic feature engineering by learning a numeric representation for a session based on raw telemetry data. This numeric representation can be learned along with the other weights of the machine learning model or come from another supervised/self-supervised task.

The process of FIG. 2 extracts features that can be used for supervised stuck moment detection, e.g., inputting the features to a trained machine learning model to determine whether the user is stuck as further described with respect to 102 of FIG. 1.

FIG. 4 is a block diagram illustrating an embodiment of a system providing resolution suggestions in a program development tool. The system 400 includes a program development tool 401 (e.g., including a programmatic logic flow builder also sometimes called a "visual modeling environment"), a code analysis engine 413, one or more ML models 414, a contextual search database 416, a repository 403, an application generator 406, an application server 408, and database 410.

Software architect(s)/developer(s) 405, including a user who is designated with the task of designing computer software design models, uses a program development tool 401 (e.g., programmatic logic flow builder, integrated development environment (IDE), visual modeling environment, Service Studio by OutSystems®, etc.) to edit, generate and modify program code components (e.g., including programmatic logic flow(s), backend code, frontend code, user interface layout(s), styling(s), configuration(s), data model(s), etc.) using a graphical user interface. In some embodiments, program development tool 401 facilitates the visual construction and modification of the program code components in a user friendly and intuitive way. For example, the program development tool 401 may allow a user to visually select elements of a programmatic logic flow, and connect them as desired. The program development tool 401 can be a software program running on a developer's 405 device, or can be software running on a server (e.g., accessed via a browser), or some combination. In one implementation, the program development tool 401 is a combination of a software program running on a developer's computer and a set of software services running on a server being accessed by the modeling environment.

Program code components 402 may include a programmatic logic flow description that describes, using abstractions, the intended behavior of a computer software system. Program code components 402 may also include backend code, frontend code, user interface layout(s), styling(s), configuration(s), data model(s), etc. Examples of functionality provided by such computer software systems include: login verification, notification, database storage, order processing, electronic wallet, calendar/scheduler, directories, news and information, and so on. Using the program development tool 401, it is possible for a developer 405 to model distinct aspects of a computer software system, such as (a) the user navigation and user interface content to be presented to end-users; (b) the business rules that apply to the execution of the interactive events triggered by the end-user; (c) and the data transmission and data repository formats and relationships that support the execution of the application. These distinct aspects, in some implementations, can describe the intended behavior of the computer software system.

The design process of the program code component 402 (e.g., programmatic logic flow, frontend code, backend code, user interface layout(s), styling(s), configuration(s), data model(s), etc.) can be assisted by the disclosed techniques. For example, code analysis engine 413 is configured to detect that developer 405 needs help and provide resolution suggestions by performing a process such as the one further described with respect to FIG. 1. Code analysis engine 413 can use one or more machine learning models 414 to make its determination and can use contextual search database 416 to make suggestions as further described herein. The machine learning model can be used by any developer via learning data from one or more developers. A single model or different models for different types of applications (business logic vs. user interfaces) can be used.

Designed program code components 402 (e.g., programmatic logic flow(s), frontend code, backend code, user interface layout(s), styling(s), configuration(s), data model(s), etc.) are submitted for storage in repository 403. For example, once a programmatic logic flow is designed, it is compiled into a programmatic logic flow description included in program code components 402 to be submitted to repository 403. The visual representations of the programmatic logic flows in the program development tool 401 are translated into a structured representation used for processing by other components of the system 400. In some embodiments, the program development tool 401 is responsible for creating a programmatic logic flow description document from visual representations. The programmatic logic flow description can be generated at various times, for example when a developer 405 triggers the submission of a programmatic logic flow to the programmatic logic flow version repository 403 or in response to developer interaction with the programmatic logic flow such as adding, removing, or modifying a step in the programmatic logic flow.

In one embodiment, the programmatic logic flow description document included in program code components 402 is structured using XML (Extensible Markup Language). XML is a language that can be used to describe information, or to make information self-describing, and which can facilitate mapping of visual models into a structured representation that can be parsed by other components of the system 400.

The repository 403 stores the program code components 402. By storing versions as development progresses, the repository retains information about how and when a program code component (e.g., a programmatic logic flow) changed over time. At any point in time, an authorized developer 405 can add a new version of a program code component to the programmatic logic flow repository 403. Additionally, the version repository 403 is integrated with the program development tool 401 to support collaboration among concurrent developers 405. In the simplest case, one single developer 405 adds revised versions of a program code component to the programmatic logic flow repository 403. In more complex implementations, multiple developers 405 retrieve and add distinct versions of a program code component to and from the repository 403. After completing a first version of a program code component, the program code component can continue to be developed, and, by learning with new developments, the model can self-evolve and optimize.

The repository 403 may be based on a database server such as Microsoft® SQL Server, Amazon® AWS Database, Oracle® Database and accessed via software services hosted in an application server system. These software services provide to the program development tool 401 means to submit and retrieve programmatic logic flows as well as to submit and retrieve information about repository 403 content.

In the context of system 400, an application generator 406 may be used to translate program code components into an implementation of a computer software system. An implemented computer software system may include an executable program 409 to run in an application server 408 and a database definition to be hosted in a relational database system 210. The user navigation and user interface aspects, as well as the business rule and data transmission aspects of the model, are translated into the executable program 409. The executable program can be any executable or interpreted program, for example a web application targeting the .NET® platform from Microsoft®, Java/Jakarta Enterprise Edition (JEE) platform available from Oracle®, or various PHP-based platforms.

The data repository aspects of the computer software system are translated into a database 410. The database can be any sort of relational database. The generated executable program 409 may be automatically configured to access the database 410 according to the designed program code component (e.g., including the programmatic logic flow).

Once the executable program 409 and the database 410 are available on the system 400, respectively in the target application server system 408 and the relational database system 410, the application server system 408 can handle requests from end users 407, for example, using a Hyper Text Transfer Protocol (HTTP) client 412, a mobile client, a Web Browser, a backend system, etc. This means that the elements in the model that denote the way end users see and interact with the computer software system are generated as code, for example Web pages that are hosted in an application server system 408 and served via HTTP to a client 412. A request generates a response that is sent back to client system 412, which then may take the form of a graphical user interface to be displayed to end user 407. Some controls embedded in the graphical user interface may react to subsequent user generated events, and cause the browser to generate subsequent requests back to the application server system 408. For example, when a user presses a button visible in the client system 412, a form may be submitted to the application server system 408 that in response provides the content of a new interactive form to the client system 412.

The work product (e.g., modules) generated by the program code component development process can be stored in a shared library of reusable modules. In various embodiments, anonymized data models and business logic patterns and/or models/patterns can be imported from third party systems.

Figure 5:
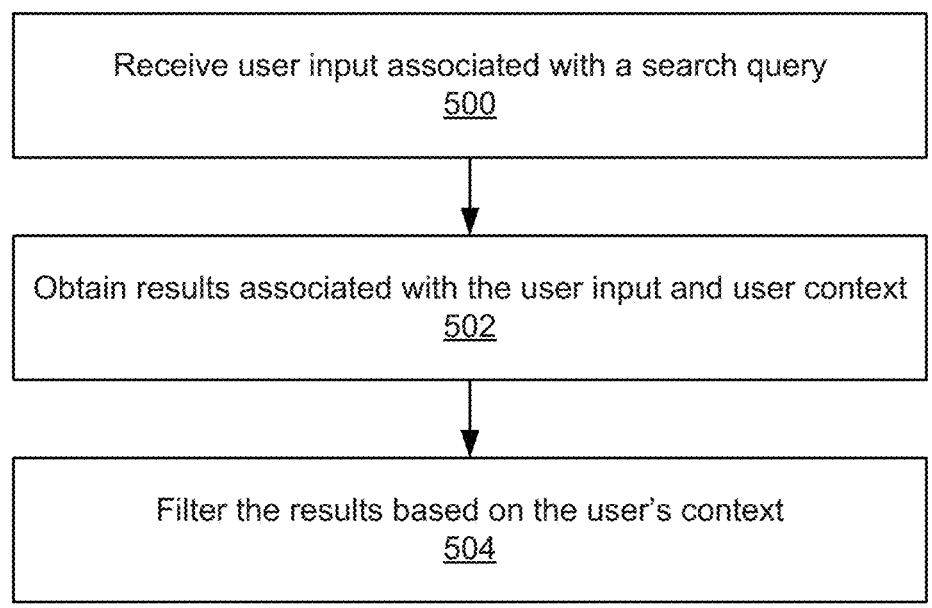
FIG. 5 is a flow diagram illustrating an embodiment of a process for providing contextual assistance.

Examples of anonymized data include:

Source code for cloud customers' software, which indicates how software is created Requirements, user stories, support tickets, or the like, which specify what the user wants Error logs, which can be analyzed to determine what went wrong with the developed software Performance analytics data, which indicate factors that impact processing speed/latency what is fast/slow End user satisfaction and feedback data, which indicates what works well and what does not work well Integrated development environment (IDE) telemetry data, which indicates how developers create software User interface mockups and final artifacts, which specify how a user wants an application or program to look FIG. 5 is a flow diagram illustrating an embodiment of a process for providing contextual assistance. This process may be performed as part of another process such as 104 of FIG. 1. Contextual assistance is an example of a resolution suggestion. This process may be implemented on a system such as system 400 shown in FIG. 4. More specifically, in various embodiments the process is performed by code analysis engine 413 in cooperation with contextual search database 416.

In the example shown, the process begins by receiving user input associated with a search query (500). The user input can be provided via a graphical user interface, examples of which are shown in FIGS. 6-7C. For example, the user can write search queries in a search box, click a button to seek help, or be working on a particular portion of a programmatic logic flow with a trigger point such as building a node within a programmatic logic flow. In some embodiments, the user input is preprocessed to generate an optimal version of the search query to be utilized.

The process obtains results associated with the user input and user context (502). For example, the process provides the search query (e.g., optimized version) and a user's context to a database or search engine. The user's context includes information related to a state of a programmatic logic flow that the user is working on or a state of a program development tool (e.g., the programmatic logic flow builder). The process then obtains search query results from the database or search engine. Referring briefly to FIG. 4, an example of the database or search engine is contextual search database 416. The database or search engine can be a customized one that searches content within, associated with, or otherwise provided by system 400. A third party can provide the search engine such as Google® Programmable Search Engine, Elastic® Search, etc.

The process performs URL (Uniform Resource Locator) clustering by mapping user search queries to the websites they ended up visiting (clicked). Several search queries can be grouped and mapped to a specific URL. Then, the process performs search query embeddings to obtain fewer and larger groups. Next, the process manually maps each cluster to a program development tool context. For each context, the process selects a predefined number of links (e.g., 10 links) that are most likely to help the user in that context. In various embodiments, the process can further fill out the list to fill top issues that were not addressed by the clusters.

The process filters the results based on the user's context (504). The results can be customized to a user's context such as the user input/search query input at 500. In various embodiments, when the user input relates to a trigger point within a programmatic logic flow, the results include pre-defined suggestions based on the place/location within the programmatic logic flow. For example, the results relate to the type of node that a user was working on when the user sought assistance. In various embodiments, there is a mapping of the user's context (e.g., trigger point) and relevant links so that given a user's context the process can look up relevant links to that context. The results can be links to content outside the program development tool for example to a Website, discussion forum, wiki, or the like.

The results can be output to a graphical user interface, examples of which are shown in FIGS. 6 and 7A-7C.

Information from the process of providing contextual assistance can be used to improve processes for providing resolution suggestions in a program development tool such as a programmatic logic flow builder (e.g., the process shown in FIG. 1). For example, data related to providing contextual assistance can be used to improve a machine learning model to better predict that a user is likely unable to proceed in the development of the application and likely needs assistance. The process can predict what a user is going to search and/or why the user is stuck and may even provide help prior to searches by anticipating a user's needs earlier as the predictive ability of the machine learning model improves.

FIG. 6 illustrates an example of guidance provided in response to detecting a stuck moment according to some embodiments. An example of a program development tool (e.g., a programmatic logic flow builder) is shown. The program development tool includes several panels in which information is displayed. As shown, a menu running across the top of the user interface provides editing functionalities such as undo, redo, etc. A node toolbar on the left side includes frequently used nodes that a developer can drag from the toolbar and drop into the central programmatic logic flow area. This example shows a state of the programmatic logic flow including a start step. The Module Elements panel on the right side shows options or other details associated with components in the user application.

When a user asks for help by clicking button 602 ("What do you want to do?"), a help interface 610 pops up. The help interface includes a search box 612, which enables a user to search the contents of the help pages listed below the search box 612. In this example, the help pages include documentation, white papers, forum discussions, and the like. The help pages can be categorized to help a user browse or find an answer more easily. In this example the categories include "Learn OutSystems," "Data and UI," and "Integrations and Extensibility."

Figure 7A:
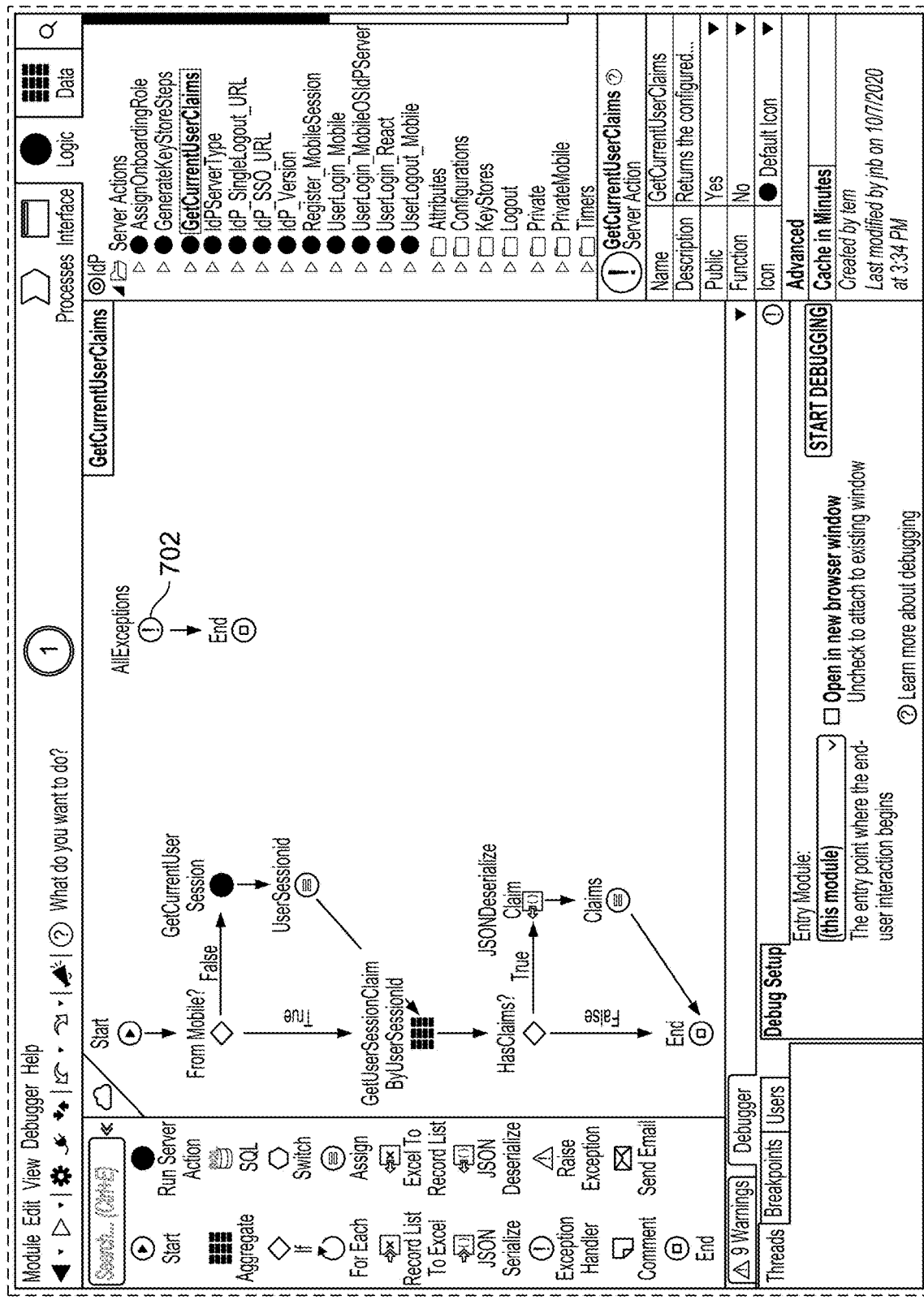
FIGS. 7A-7C illustrate examples of guidance provided at a trigger point in response to detecting a stuck moment according to some embodiments.
Figure 7B:
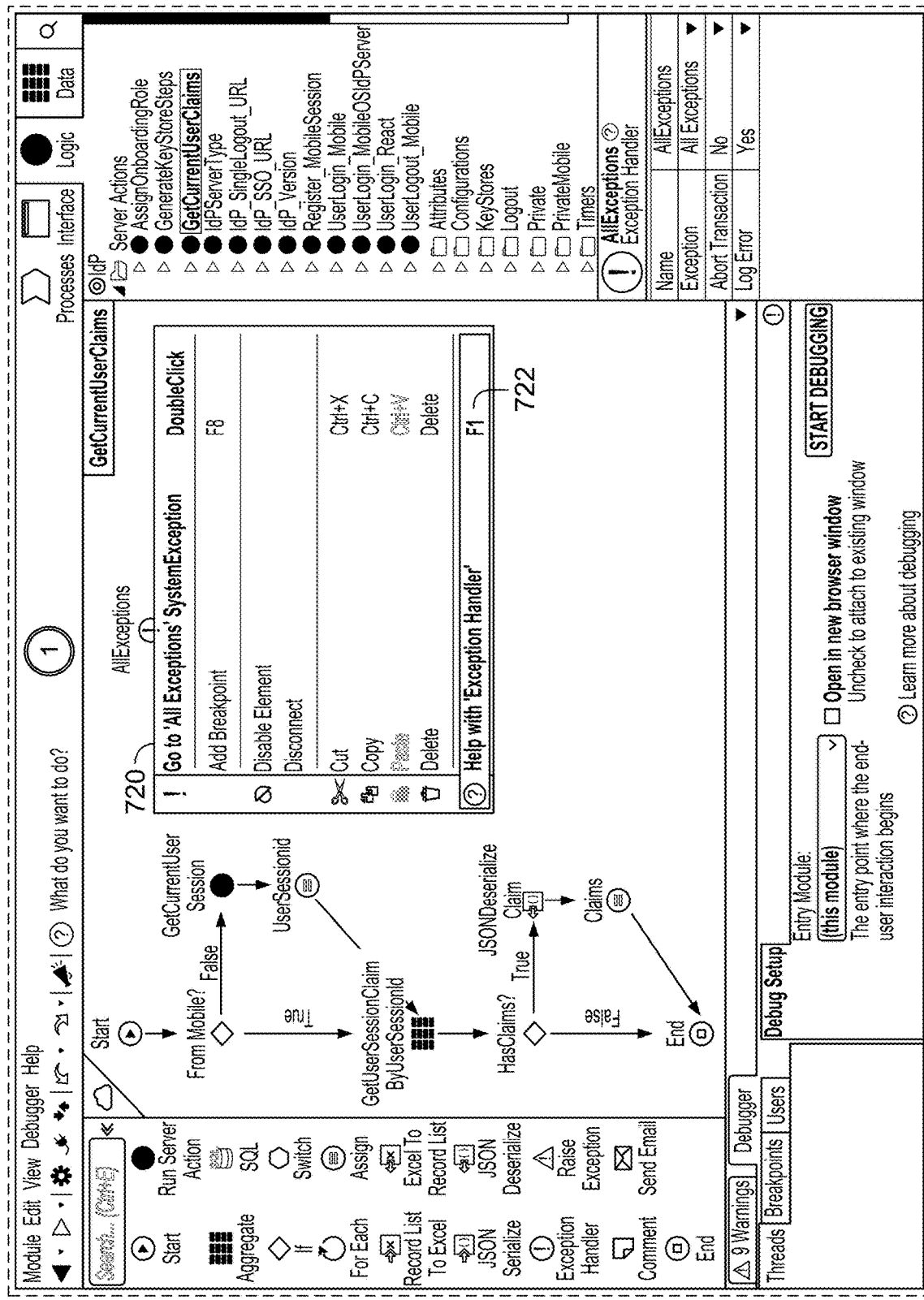
Figure 7C:
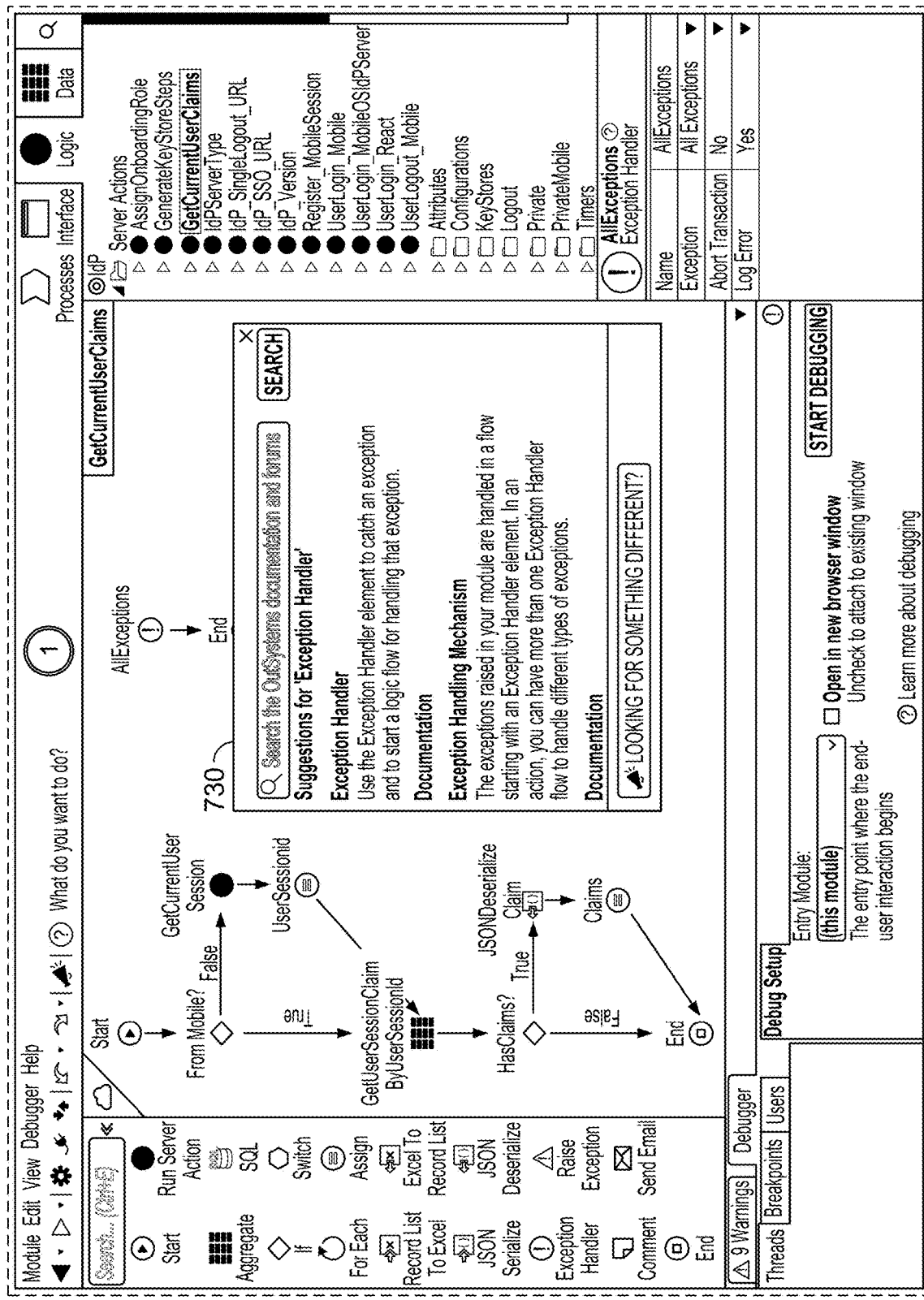

FIGS. 7A-7C illustrate examples of guidance provided at a trigger point in response to detecting a stuck moment according to some embodiments. An example of a program development tool (e.g., a programmatic logic flow builder) is shown. Each of the components are like their counterparts in FIG. 6 unless otherwise described herein. A programmatic logic flow is shown, and there can be trigger points within the programmatic logic flow such as at the nodes. In this example, a user seeks help when they are at node 702, which is a node related to exceptions' handling. This can be done for example by right clicking the node to call up menu 720. Within menu 720 is an option 722 for "Help with 'Exceptions Handler'". Upon clicking option 722, a help interface 730 pops up. Help interface 730 is similar to help interface 610, but is specific to Exceptions Handler (instead of general). Help interface 730 includes a search box to enable the user to search within the help pages related to the Exceptions Handler.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    tracking user interactions and states of a program development tool utilized to develop an application including by:
        tracking a plurality of time windows of a user interaction session, and
        for each of at least a portion of the plurality of time windows, determining a set of features;
    providing input features including the determined set of features associated with the tracked user interactions and the states to a trained machine learning model to determine a prediction result associated with whether a user is likely unable to proceed in the development of the application and likely needs assistance; and
    in response to a determination that the prediction result at least meets a threshold, automatically providing one or more resolution suggestions, wherein the one or more resolution suggestions is at least one of: automatically selected based on at least a portion of the tracked user interactions and states, or automatically selected based at least in part the prediction result.

2. The method of claim 1, wherein each of the plurality of time windows is of a pre-defined and fixed size.

3. The method of claim 1, wherein the determined set of features includes telemetry data.

4. The method of claim 1, wherein the determined set of features includes state evolution data.

5. The method of claim 1, wherein the determined set of features includes user interaction data.

6. The method of claim 1, wherein the tracking of the user interactions and the states of the program development tool utilized to develop the application includes:
performing automatic feature engineering including by learning a numeric representation for the user interaction session based on raw telemetry data, wherein the feature engineering is used to generate features included in the input features to the trained machine learning model.

7. The method of claim 1, wherein the determination of the prediction result associated with whether the user is likely unable to proceed in the development of the application and likely needs assistance is based at least in part on weighting samples proportional to a distance to the beginning of a time window where the user is unable to proceed in the development of the application.

8. The method of claim 1, wherein the machine learning model is trained to predict that the user is likely unable to proceed in the development of the application and likely needs assistance before a threshold time has elapsed during a time window where the user is unable to proceed in the development of the application.

9. The method of claim 1, further comprising outputting the tracked user interactions, the states of the program development tool utilized to develop the application, and the one or more resolution suggestions to further train the machine learning model.

10. The method of claim 1, wherein the one or more resolution suggestions include links to documentation.

11. The method of claim 1, wherein the one or more resolution suggestions include at least one of: suggestion and auto-filled content.

12. The method of claim 1, wherein the one or more resolution suggestions include static suggestions refactored to be dynamic based on the tracked user interactions and the states.

13. The method of claim 1, further comprising determining the one or more resolution suggestions including by:
receiving user input associated with a search query, wherein the user input is preprocessed;
obtaining results associated with the user input and user context; and
filtering the results based on the user's context.

14. The method of claim 13, wherein obtaining the results associated with the user input and the user context includes: performing URL (Uniform Resource Locator) clustering by mapping the search query to links;
performing search query embeddings to obtain groups; and
selecting a predefined number of links to be presented as the results.

15. The method of claim 1, wherein automatically providing the one or more resolution suggestions includes outputting the one or more resolution suggestions on a graphical user interface.

16. The method of claim 1, wherein automatically providing the one or more resolution suggestions includes displaying the one or more resolution suggestions within the program is development tool.

17. The method of claim 1, wherein automatically providing the one or more resolution suggestions includes displaying the one or more resolution suggestions next to a trigger point in a programmatic logic flow within the program development tool.

18. A system, comprising:
a processor configured to:
track user interactions and states of a program development tool utilized to develop an application including be being configured to:
track a plurality of time windows of a user interaction session, and
for each of at least a portion of the plurality of time windows, determine a set of features;
provide input features including the determined set of features associated with the tracked user interactions and the states to a trained machine learning model to determine a prediction result associated with whether a user is likely unable to proceed in the development of the application and likely needs assistance; and
in response to a determination that the prediction result at least meets a threshold, automatically provide one or more resolution suggestions, wherein the one or more resolution suggestions is at least one of: automatically selected based on at least a portion of the tracked user interactions and states, or automatically selected based at least in part the prediction result; and
a memory coupled to the processor and configured to provide the processor with instructions.

19. The system of claim 18, wherein the processor is further configured to determine the one or more resolution suggestions including by being configured to:
receive user input associated with a search query, wherein the user input is preprocessed;
obtain results associated with the user input and user context; and
filter the results based on the user's context.

20. A computer program product embodied in a non-transitory computer readable medium and comprising computer instructions for:
tracking user interactions and states of a program development tool utilized to develop an application including by:
tracking a plurality of time windows of a user interaction session, and
for each of at least a portion of the plurality of time windows, determining a set of features;
providing input features including the determined set of features associated with the tracked user interactions and the states to a trained machine learning model to determine a prediction result associated with whether a user is likely unable to proceed in the development of the application and likely needs assistance; and
in response to a determination that the prediction result at least meets a threshold, automatically providing one or more resolution suggestions, wherein the one or more resolution suggestions is at least one of: automatically selected based on at least a portion of the tracked is user interactions and states, or automatically selected based at least in part the prediction result.

* * * * *